United States Patent
Rodgers et al.

(10) Patent No.: US 6,296,329 B1
(45) Date of Patent: Oct. 2, 2001

(54) ENDLESS RUBBER TRACK AND VEHICLE CONTAINING SUCH TRACK

(75) Inventors: Michael Brendan Rodgers, Copley; Ram Murthy Krishnan, Munroe Falls; Paul Harry Sandstrom; Neil Arthur Maly, both of Tallmadge; Larry Ashley Gordon, Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/493,371

(22) Filed: Jan. 28, 2000

Related U.S. Application Data

(63) Continuation-in-part of application No. 09/310,509, filed on May 12, 1999, now abandoned.

(51) Int. Cl.[7] .................................................. B62D 55/24
(52) U.S. Cl. .......................... 305/165; 305/178; 524/492; 525/98
(58) Field of Search .................................. 305/165, 178; 524/492, 493, 495, 496; 525/98, 99, 314

(56) References Cited

U.S. PATENT DOCUMENTS

| 2,887,343 | 5/1959 | West | 350/10 |
|---|---|---|---|
| 3,781,067 | 12/1973 | Dodson et al. | 305/35 |
| 3,900,231 | * 8/1975 | Odou | 305/178 |
| 4,279,449 | 7/1981 | Martin et al. | 305/35 |
| 4,861,842 | * 8/1989 | Cohen et al. | 525/329.3 |
| 5,227,425 | * 7/1993 | Rauline | 524/493 |
| 5,264,290 | 11/1993 | Touchet et al. | 428/492 |
| 5,484,321 | 1/1996 | Ishimoto | 446/433 |
| 5,679,744 | 10/1997 | Kawauzra et al. | 525/98 |
| 5,773,504 | 6/1998 | Smith et al. | 524/492 |
| 5,798,405 | 8/1998 | Zimmer et al. | 524/496 |
| 5,894,900 | 4/1999 | Yamamoto et al. | 180/9.36 |
| 5,896,904 | * 4/1999 | Ozaku et al. | 524/495 X |

FOREIGN PATENT DOCUMENTS

| 0326394 | 8/1989 | (EP) . |
| 0900826 | 3/1999 | (EP) . |
| 1052165 | 11/2000 | (EP) . |
| 9916600 | 4/1999 | (WO) . |

OTHER PUBLICATIONS

European Search Report Apr. 8, 1999.

* cited by examiner

*Primary Examiner*—Russell D. Stormer
(74) *Attorney, Agent, or Firm*—Henry C. Young, Jr.

(57) ABSTRACT

The invention relates to an endless vehicular rubber track. The invention particularly relates to such track having a ground-contacting tread component of a rubber composition.

10 Claims, 1 Drawing Sheet

ENDLESS RUBBER TRACK AND VEHICLE CONTAINING SUCH TRACK

This application is a C-I-P of Ser. No. 09/310,509, filed May 12, 1999 now abandoned.

BACKGROUND OF THE INVENTION

The invention relates to an endless vehicular rubber track. The invention particularly relates to such track having a ground-contacting tread component of a rubber composition.

Endless rubber tractor tracks are increasingly being used for propelling various vehicles over the ground such as, for example, various tractors and other agricultural vehicles including, for example, combines and spreaders, as well as various earth moving machines.

In particular, such track is conventionally positioned over at least two wheels, normally a drive wheel for engaging an inner surface of the track and driving the track and at least one driven wheel to control the path of the track as it moves to propel the associated vehicle. The outer surface of the peripheral tread configuration of the track typically contains a plurality of raised lugs designed for engaging the ground and assisting the propelling of the associated vehicle such as, for example, a tractor over an agricultural ground, such as lugs, are referred to herein as ground-contacting lugs.

In practice, the ground-contacting tread of such rubber tracks provide a considerably wider footprint than conventional pneumatic tires and are, thereby, more adaptable to agricultural fields in that they offer better flotation and less soil compaction than rubber tires, which may result in better crop yield. In addition, use of rubber tracks instead of pneumatic tires may permit a farmer to get out into a field earlier in the planting season and plant crops sooner in point of time and may permit a harvesting of a crop on a more timely basis as compared to conventional pneumatic rubber tire equipped agricultural vehicles. Such use and advantages of rubber tractor tracks are well known to those having skill in such art.

Such rubber tracks are conventionally in a form of an endless rubber belt reinforced with continuous steel cables molded into the rubber composition itself to add dimensional stability for the track.

As the rubber track is driven around the aforesaid wheels, it is (1) subject to extensive contortional flexing and, thus, may be subject to tread crack initiation and propagation over time and (2) may be subject to various agricultural chemicals and crop stubble as is well known to those having skill in such art.

Accordingly, it is desired that the rubber composition for the ground-contacting tread component of the track have appropriate resistance to flex fatigue, resistance to abrasion and durability.

In the description of this invention, the term "phr" represents parts by weight of a particular material per 100 parts by weight of rubber. As used herein, the terms rubber and elastomer may be used interchangeably, unless otherwise identified.

BRIEF SUMMARY OF THE INVENTION

In accordance with this invention, an endless rubber track designed to encompass at least one drive wheel and at least one driven wheel is comprised of an inner component containing a plurality of guide lugs designed to be engaged and/or guided by said drive and driven wheels and an outer tread component, said tread component being of a configuration comprised of a plurality of co-extensive, raised lugs thereon designed to ground engaging; wherein said tread, designed to be ground contacting, is of a rubber composition comprised of, based upon 100 parts by weight elastomers (phr)

(A) elastomers comprised of:
  (1) about 15 to about 40 phr of cis 1,4-polybutadiene elastomer and, correspondingly;
  (2) 60 to about 85 phr at least one additional elastomer selected from:
     (a) about 60 to about 75, alternatively about 40 to about 55, phr of natural cis 1,4-polyisoprene elastomer and, correspondingly;
     (b) zero to about 15, alternatively about 5 to about 10, phr of styrene/butadiene copolymer rubber which contains from about 10 to about 40 weight percent bound styrene; wherein said additional elastomer is preferably only natural rubber,
(B) about 40 to about 80 phr of reinforcing filler comprised of carbon black and a minor amount of precipitated silica; wherein said carbon black is present in an amount of about 35 to about 65 phr and said precipitated silica is present in an amount of from 3 to about 15 phr; wherein said reinforcing filler is exclusive of a coupling agent having a moiety reactive with silanol groups on the surface of said silica and another moiety interactive with said elastomer(s);
(C) sulfur curative in a range of about 0.75 to about 1.5 phr and a sulfenamide sulfur cure accelerator;
(D) about 4.5 to about 10 of antidegradant; and
(E) zero to about 10, preferably about 1 to about 5, phr of rubber processing oil selected from at least one of aromatic rubber processing oil and mixture of aromatic and naphenic rubber processing oil; wherein said carbon black is characterized by having an Iodine Number in a range of about 115 to about 130 g/kg, a DBP value in a range of about 105 to about 125 $cm^3/100$ g, and a Tint value in a range of about 120 to about 140.

The invention also contemplates a vehicle containing at least two (2) of said endless tracks.

BRIEF DESCRIPTION OF THE DRAWINGS

For a further understanding of this invention, the accompanying drawings are referred to in FIG. 1 which depicts a perspective view of an endless rubber track.

DETAILED DESCRIPTION OF THE INVENTION

Figure 1:
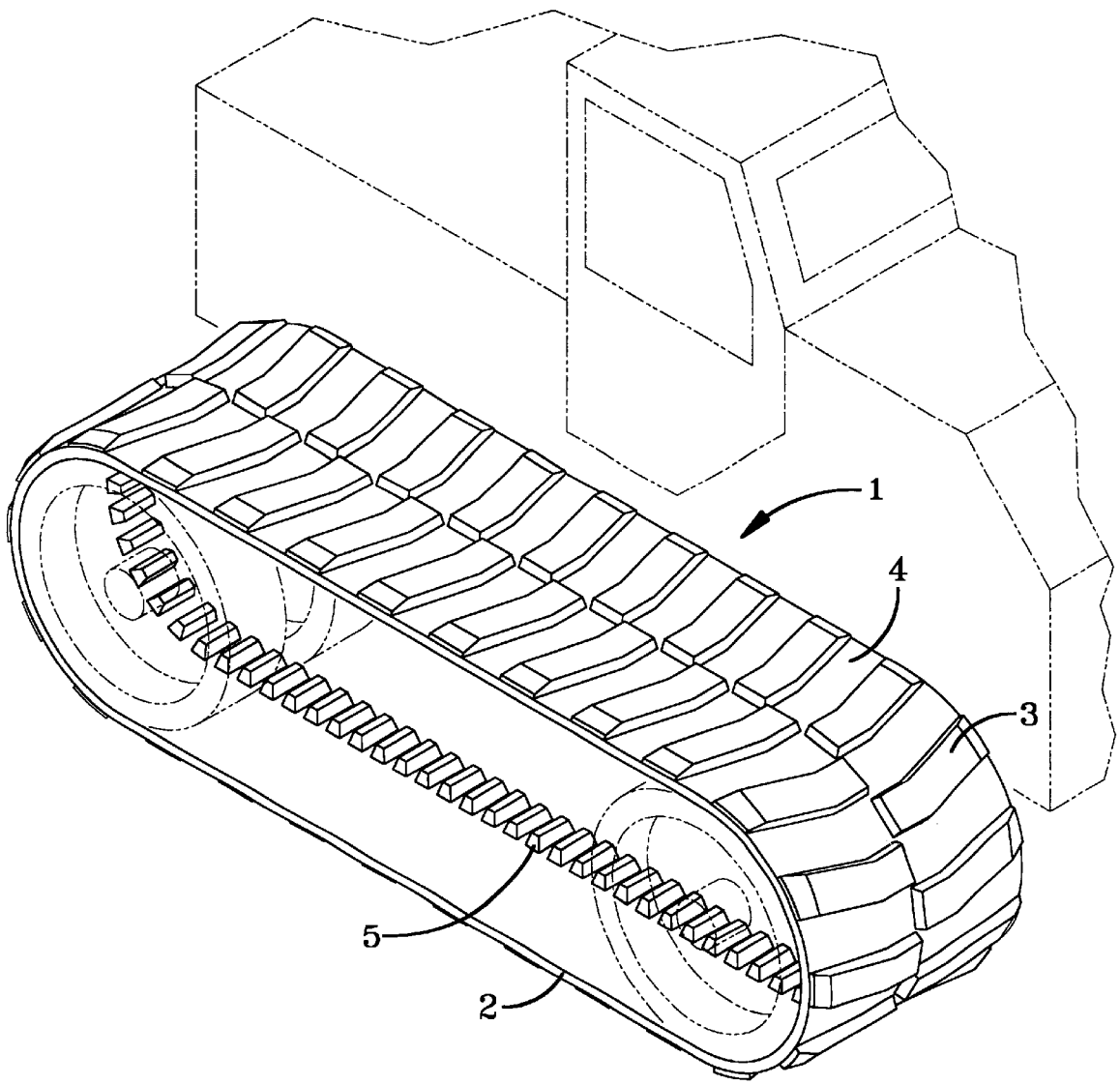
Figure 2:
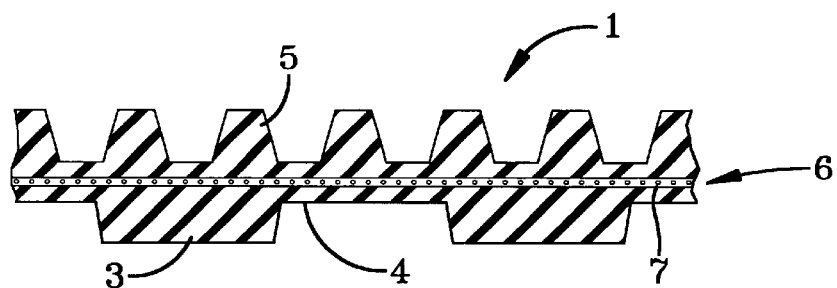
FIG. 2 depicts a longitudinal cross-section of such track.

In practice, it is preferred that said additional elastomer is natural rubber in order to enhance resistance to flex fatigue and tear.

Preferably, as a limitation to the above rubber composition, such rubber composition for said track tread component is characterized by having a minimum flex fatigue resistance of at least about 90 kilocycles at 65 percent strain according to ASTM D4482, and abrasion resistance in a range of about 70 to about 180 according to ASTM D5963.

In further accordance with this invention, a vehicle is provided having at least two endless rubber track systems, namely a track system on each side of the vehicle, for driving said vehicle over the ground, said track systems individually comprised of the track of this invention, a plurality of wheels engaged with said vehicle and encompassed by said track wherein at least one of said wheels is a drive wheel.

The flex fatigue limitation of the cured track's tread rubber composition is considered herein to be important or significant to the durability and service life of the track tread.

The abrasion resistance of the cured track's tread rubber composition is considered herein to be important or significant to wear performance of the track tread (e.g.: resistance to wear due to abrasion).

The prescribed combination of elastomers, carbon black, silica and antioxidant content of the cured track's ground-contacting tread rubber composition is considered herein to be important or significant to aid in achieving the track tread's performance (e.g.: resistance to flex fatigue and resistance to wear).

In addition to the above physical properties of the cured track's ground-contacting tread rubber composition, significant aspects of this invention are (1) use of a combination of natural rubber and cis 1,4-polybutadiene rubber designed to promote treadwear and flex fatigue resistance;

(2) relatively low level (content) of sulfur curative designed to promote less crosslinking and higher chain extension of the tread rubber composition;

(3) exclusion of a coupling agent for the silica designed to increase the cured elastomer composition's resistance to flex fatigue and maintain resistance to tear propagation as compared to such composition using a silica coupling agent;

(4) specified carbon black as a tire tread grade of carbon black in order to arrive as a suitable tear strength and resistance or tread service related damage;

(5) relatively high antioxidant content, usually a combination of antioxidant and antiozonant, in order to achieve suitable long term durability and resistance to flex fatigue; and (6) relatively low level of rubber processing oil, if any, in order to promote a relatively high tensile strength for the track tread rubber composition. Indeed, while the individual ingredients are known, it is considered that the above combination of ingredients for the tread component of the endless track for this invention is novel and inventive.

The track, including its ground-contacting tread component, is then sulfur cured (vulcanized) in a suitable mold at an elevated temperature (e.g.: about 150° C. to about 170° C.) at an elevated temperature.

Accordingly, the invention also contemplates a sulfur-vulcanized endless track. Further, the invention contemplates a vehicle having at least two endless rubber track systems (each on an opposite side of the vehicle) for driving said vehicle over the ground, said track systems individually comprised of said track, a plurality of wheels engaged with said vehicle and encompassed by said track wherein at least one of said wheels is a drive wheel.

In the drawings, a rubber track (1) is provided having a rubber ground-contacting tread component (2) of a lug (3) groove and (4) configuration. The ground-contacting tread component (2) is of a rubber composition composed of cis 1,4-polyisoprene natural rubber and cis 1,4-polybutadiene rubber which contains a combination of prescribed carbon black and precipitated silica reinforcement in combination of a designed balance between curing system, antidegradant and rubber processing oil according to this invention.

Guide lugs (5) positioned on the inner surface of the track (1) are also shown which can be engaged by an appropriate drive wheel of the vehicle to drive the track (1). Alternatively, the track (1) can be driven by a friction wheel.

The track (1) itself is composed of the circumferential ground-contacting tread component (2) on a carcass (6) which contains a fabric (e.g. steel or glass fiber reinforced plastic) belt reinforcement (7) for dimensional stability.

FURTHER DESCRIPTION OF THE INVENTION

It is to be appreciated that use of the track tread in an agricultural operation presents problems not normally experienced by a toroidially-shaped pneumatic tire. In one aspect, the track has a relatively thin cross-section not supported by pneumatic air pressure as would be experienced by a pneumatic tire. Further, the ground-contacting portion of the track inherently presents a large footprint on the ground whereas a toroidal pneumatic tire presents a relatively small footprint.

Indeed, the track's ground-contacting tread presents special problems and challenges as it propels a vehicle over what is usually a relatively harsh environment comprising a ground which may contain various agricultural chemicals as well as crop stubble which can abrade away or even puncture the surface the track tread.

Accordingly, it is desirable to provide a track with a ground-contacting tread which it presents abrasion resistance to wear occurring from the ground and crop stubble contact and, also, flex fatigue as it contorts around the various drive and driven wheels of the associated vehicle.

In particular, and for the purposes of this invention, the track's ground contacting tread rubber composition is composed of specified elastomers, carbon black, silica in the absence of coupling agent, as well as controlled selection and amounts of antidegradant, processing oil and sulfur-cure accelerators.

It is to be appreciated that the individual materials recited above have been and are being utilized for various tread compositions for various pneumatic tires.

However, it is considered herein that it is a significant aspect of this invention that the specified components for the rubber composition for the track's ground-contacting tread are novel and inventive in that specified ingredients are chosen and utilized in a unique combination thereof by the specified combination thereof as well as specified amounts for a track rubber tread component.

In particular, the carbon black is a tire tread grade of carbon black with an Iodine Number (ASTM D1510) in a range of about 115 to about 130 g/kg, a dibutyl phthalate (DBP) value (ASTM) D2414) in a range of about 105 to about 125 cm$^3$/100 g and a Tint value (ASTM D3265) in a range of about 120 to about 140. Representative examples of such carbon blacks are, for example, those of ASTM designations N-220 and N234.

In particular, the Iodine Number limitation for the carbon black is considered herein to be important, or significant, to enhance abrasion resistance and hysteretic qualities of the track tread rubber composition. The DBP value limitation for the carbon black is considered herein to be important or significant to enhance resistance to flex fatigue of the track tread rubber composition. The Tint value limitation is considered herein to be important or significant to enhance abrasion resistance for the track tread rubber composition.

In the practice of this invention, a relatively high level, or content, of antidegradant is used, namely, in a range of about 4.5 to about 10 phr in order to enhance resistance to flex fatigue over time for the track tread rubber composition. Such antidegradants should be a combination of antiozonant and antioxidant for rubber compositions as conventionally used for cured rubber compositions intended to be exposed to atmospheric conditions in dynamic applications.

Representative examples of such antidegradants are, for example, polymerized 2,2,4-trimethyl 1,2-dihydroquinoline which might be obtained as Flectol TMQ from the Flexsys America L.A. company, N-1,3-dimethylbutyl-N'-phenyl para-phenylenediamine which might be obtained as Flexzone® 7F and mixed aryl-p-phenylenediamines such as Wingstay® 100, a trademark of The Goodyear Tire & Rubber Company. Such antidegradants are well known to those having skill in such art.

Use of aromatic hydrocarbon rubber processing oils in a range of zero to about 10, preferably about one to about 10, phr is desired for the practice of this invention in order to enhance processability of the unvulcanized rubber composition for the track tread as well as to enhance a balance of a combination of tensile strength and elongation of a sulfur-vulcanized track tread rubber composition. Such aromatic rubber processing oil as well as mixtures of alkylated napthenic and aromatic hydrocarbon rubber processing oils, and their use as processing aids, are well known to those having skill in the preparation of rubber compositions.

It is desired, for the practice of this invention, that a semi-EV vulcanization system be used which is comprised of a relatively limited sulfur content in a range of about 0.75 to 1.5 phr in combination with a primary sulfenamide-based accelerator preferably selected from at least one cyclohexylbenzothiazole sulfenamide, tert-butyl-2-benzothiazole sulfenamide and N-dicyclohexyl-2-benzothiazole sulfenamide, all of which are well known primary sulfur-vulcanization accelerators.

By the term "semi-EV vulcanization system", as used in the description of this invention, it is meant that approximately equal amounts (phr) of primary accelerator(s) and added free sulfur are used.

It is to be appreciated that secondary accelerator(s) as well as vulcanization retarder(s) may also be used where appropriate to control the vulcanization reaction. In the practice of this invention, silica, particularly precipitated silica, is used primarily to assist in enhancing, or reducing, tear resistance of the track tread's rubber composition. Various silicas may be used, preferably precipitated silicas. Precipitated silicas for use in rubber compositions, including for tire treads, are well known to those skilled in such art. Representative of such silicas are, for example, HiSil 210 and HiSil from PPG Industries. In the practice of this invention, preferably a silica coupler is not used.

It is readily understood by those having skill in the art that the rubber composition of the track's ground-contacting tread rubber may be compounded by methods generally known in the rubber compounding art, such as, unless otherwise specified herein, mixing the sulfur-vulcanizable constituent diene-based elastomers with various commonly-used additive materials such as, for example, curing aids, such as sulfur, activators, retarders and accelerators, processing additives, such as the aforesaid aromatic rubber processing oils, resins including tackifying resins if used, plasticizers if used, fatty acid including stearic acid, zinc oxide, waxes, antioxidants and antiozonants as discussed herein, peptizing agents if used, and reinforcing fillers such as carbon black and precipitated silica as discussed herein. As known to those skilled in the art, depending on the intended use of the sulfur vulcanizable and sulfur-vulcanized compounds or tread compounds, the additives mentioned above are selected and commonly used in conventional amounts unless otherwise specified for the track tread of this invention.

Typical amounts of tackifier resins, if used, may be, for example, about 1 to about 5 phr, usually about 1 to about 5 phr. Typical amounts of processing aids, if used, may be about 1 to about 10 phr. Such processing aids can include, for example, the aforesaid aromatic rubber processing oil which includes a combination, of mixture, of aromatic and naphthenic rubber processing oil. Typical amounts of fatty acids, if used, which can include stearic acid may be, for example, about 0.5 to about 4 phr. Typical amounts of zinc oxide may be, for example, about 2 to about 5 phr. Typical amounts of waxes if used, such as microcrystalline waxes may be, for example, about 1 to about 5 phr. Typical amounts of peptizers, if used, may be, for example, about 0.1 to about 1 phr. Typical peptizers may be, for example and if used, pentachlorothiophenol and dibenzamidodiphenyl disulfide.

The vulcanization is conducted in the presence of a sulfur-vulcanizing agent, accelerator and, optionally, a secondary accelerator and/or retarder in the practice of this invention in which, as hereinbefore related, a semi-EV vulcanization system is prescribed.

If a secondary accelerator is used, the secondary accelerator may be, for example, a guanidine, dithiocarbamate or thiuram compound.

A portion of the selection and amounts of the various compounding ingredients are important as hereinbefore described. Otherwise the selection and amounts may be adjusted or modified by the practitioner as deemed suitable for the desired track tread properties.

The track can be built, shaped, molded and cured by various methods which are known or apparent to those having skill in such art.

The rubber composition, or compound, for the tractor track ground-contacting tread may be prepared, for example, by mixing the ingredients in several sequential non-productive stages (without the sulfur and associated accelerator(s) curatives together with antidegradant(s) to temperatures of about 165° C. followed by a final productive mixing stage to a temperature of about 105° C. in which the curatives and antidegradants are added. An internal rubber mixer (Banbury type) may be used.

The resulting uncured rubber compounds may then be extruded to form, for example, one or more sections of the track which, in turn, may be inserted into a suitable mold and cured at a temperature of, for example, about 150° C. to form a continuous track.

EXAMPLE I

Rubber compositions are prepared which are referred to as Samples X, Y and Z. Sample X is used as a Control.

Control Sample X is based upon an elastomer composition of natural rubber/SBR/silica/coupling agent/conventional sulfur-vulcanization system.

Accordingly, Samples Y and Z represent rubber compositions for the ground-contacting tread portion of the track of this invention.

The compositions for the Samples are shown in the following Table 1.

Significantly, Sample X utilized Carbon black A and Samples Y and Z utilized Carbon black B. Carbon black B differs from Carbon Black A by having a significantly higher Tint value and Nitrogen Surface Area. This is considered as being significant because it enables an improvement (increase) in abrasion resistance which is somewhat predictive of reduced treadwear for the track surface and tear strength for the rubber composition.

For the rubber composition, the ingredients are first mixed in at least one non-productive mixing stage for about five minutes to a temperature of about 165° C. The non-productive mix stages refer to the mixing of the ingredients without the curatives such as sulfur and vulcanization accelerators. The term "non-productive" mixing is well known to those having skill in such art. Then the sulftur curative, together with accelerator(s), is mixed in a final mixing stage for about 2 minutes to a temperature of about 110° C.

TABLE 1

|  | Sample X Control | Sample Y | Sample Z |
| --- | --- | --- | --- |
| Non-Productive Mixing | | | |
| Natural rubber[1] | 80 | 80 | 65 |
| SBR[2] | 20 | 0 | 0 |
| Polybutadiene rubber[3] | 0 | 20 | 35 |
| Carbon Black A[4] | 48 | 0 | 0 |
| Carbon Black B[5] | 0 | 48 | 65 |
| Silica[6] | 7 | 7 | 5 |
| Coupling Agent[7] | 2 | 0 | 0 |
| Zinc oxide | 4 | 3.5 | 3.5 |
| Fatty acid | 3 | 2 | 2 |
| Antidegradants[8] | 2.8 | 8 | 8 |
| Processing oil, aromatic[9] | 9 | 6 | 6 |
| Resin[10] | 5 | 4 | 4 |
| Productive Mixing | | | |
| Sulfur[11] | 1.5 | 0.95 | 0.95 |
| Accelerators[12] | 1.4 | 1.5 | 1.5 |

[1]Natural cis 1,4-polyisoprene rubber.
[2]Styrene/butadiene copolymer rubber as PLF1502 from The Goodyear Tire & Rubber Company having a styrene content of about 23% and prepared by emulsion polymerization.
[3]Cis 1,4-polybutadiene rubber as BUDENE ® 1207 from The Goodyear Tire & Rubber Company having a cis 1,4-content of greater than 90 percent.
[4]N220 carbon black having an Iodine No. of about 121, a DBP value of about 114, a Nitrogen absorption value of about 119 and a Tint value of about 116.
[5]Carbon black having an Iodine No. of about 122, a DBP value of about 114, a Nitrogen absorption area value of about 130, and Tint value of about 131.
[6]Precipitated silica as HiSil 210 from PPG Industries.
[7]Coupling agent as X50S from Degussa AG, a blend of bis(3-triethoxysilylpropyl) tetrasulfide and carbon black carrier combination in a 50/50 ratio.
[8]Antioxidant as polymerized 2,2,4-trimethyl 1,2 dihydroquinoline obtained as Flectol TMQ from the Flexsys America L.P. company, amine-based antiozonant as N-1,3-dimethylbutyl-N'-phenylene diamine, from The Goodyear Tire & Rubber Company and amine-based antioxidant/antiozonant as mixed aryl-p-phenylene diamines, as Wingstay ® 100, a trademark of The Goodyear Tire & Rubber Company.
[9]Aromatic rubber processing oil.
[10]Phenolformaldehyde type resin.
[11]Rubber Maker's sulfur.
[12]N-t-butyl-2-benzothiazole sulfenamide primary accelerator and N-(cyclohexylthio) phthalimide retarder.

In practice, aromatic rubber processing oil might be used in amounts of from zero phr and resins, such as, for example, alkylated napthenic and aromatic hydrocarbons, gum rosin and heat reactive hydrocarbon resins, such as may be used in amounts of zero to 5 or even up to about 10, for example, phenolformaldehyde-type resins phr.

EXAMPLE II

The rubber compositions of Example I were cured for about 50 and for about 100 minutes, respectively, at a temperature of about 1 50° C. in order to evaluate the effect of curing the rubber samples over time. Various physical properties of the rubber compositions were measured and reported in the following Tables 2 and 3. Samples X, Y and Z correspond to Samples X, Y and Z of Example I.

In particular, physical properties for the rubber compositions cured for 50 minutes are shown in Table 2 and physical properties for the rubber compositions cured for 100 minutes are shown in Table 3.

TABLE 2

| Property | Sample X Control | Sample Y | Sample Z |
| --- | --- | --- | --- |
| 300% Modulus (MPa)[1] | 10.9 | 5.6 | 72 |
| Tensile (MPa)[1] | 22 | 20 | 19 |
| Elongation (%)[1] | 562 | 708 | 626 |
| Rebound (100° C.)[2] | 50 | 52 | 48 |
| Rebound (23° C.)[2] | 35 | 38 | 36 |
| Hardness, Shore A[3] | 69 | 59 | 63 |
| Abrasion resistance at 10 Newtons (mm$^3$ loss)[4] | 137 | 160 | 94 |
| Fatigue flex test (kilocycles to failure) at 95% strain[5] | 27 | 48 | 48 |
| Fatigue flex test (kilocycles to failure) at 65% strain[5] | 81 | 130 | 136 |
| Peel adhesion (N/mm)[6] | 38 | 48 | 46 |
| Crack initiation test (Hours to crack At 135° C. | 98 | No cracks after 100 hrs. | 96 |

[1]Tensile strength, elongation at break and 300% modulus were measured according to ASTM Test D412 (ring sample option) and are considered herein as a measure of the strength of the respective rubber compositions. Higher values are usually indicative of greater durability. For example, a tensile strength greater than 18 MPa is desired for the tread rubber composition of the track of this invention.
[2]The Rebound test (ASTM D1054) provides a measure of hysteretic properties of the rubber compositions. A higher value is indicative of a less hysteretic running rubber composition which is preferred. A track with tread rubber composition with higher rebound value would be expected to exhibit a lower operating temperature when used in service.
[3]The abrasion test (ASTM D5963), somewhat similar to a DIN abrasion test, is indicative of wear due to abrasion, measured by loss of the rubber composition, and a lower value is better which indicates greater resistance to wear for the rubber composition.
[4]The Shore A hardness test (ASTM D2240) is indicative of greater resistance to field crop stubble penetration and a higher value is preferred.
[5]Kilocycles to fatigue flex failure (ASTM D4482) is indicative of resistance to track tread fatigue cracking and a higher value is preferred. Testing in this instance used a strain of either 65 percent or 95 percent.
[6]Peel adhesion comparison is a measure of tear strength values for Samples X, Y and Z. Tear strength improvement for Sample Z is in the order of 21 percent as compared to Sample X and is considered to be predictive of the tread material's resistance to damage in field service. Therefore, a higher value is preferred. A description of the peel adhesion test may be found in U.S. Pat. No. 5,310,921.
[7]Time to crack initiation (ASTM D454) which is indicative of tread durability for the track and a higher value is preferred.

The following physical properties of the Samples Y and Z are significantly better, or substantially equivalent, as compared to Control Sample X.

1. greater elongation at break;
2. greater number of kilocycles to Fatigue failure;
3. substantially equivalent Rebound properties;
4. substantially equivalent hardness and tensile strength; and
5. substantially improved peel adhesion.

The improvements in the above respective elongation and fatigue failure properties while substantially maintaining Rebound, hardness, tensile strength and resistance to crack initiation is a significant overall improvement, particularly for durability of a rubber composition for a track's ground-contacting tread portion which is expected to undergo extensive flexing when used as a vehicular track.

Such improvement is particularly evident for Sample Z which also exhibited a significant improvement in abrasion resistance.

It is considered herein that such improvements in the respective physical properties of Samples Y and Z, and particularly Sample Y, are achieved via a combination of 1. replacement of the styrene/butadiene rubber with cis 1,4-polybutadiene rubber and using an increased amount for Sample Y; and
2. use of a carbon black with higher colloidal properties as indicated by higher tint value 131 and higher nitrogen adsorption value of 130.

It is important to appreciate that varying selection and amounts of ingredients in a rubber composition involves many trade-offs insofar as resultant rubber composition properties is concerned, particularly since it is often not reasonably possible to achieve all of desired physical properties for a tread rubber composition.

For endless track treads of this invention, particularly for the ground-contacting lug portion, a primary objective is to maximize flex life and minimize both track wear and crack formation.

The properties shown in Table 2 and the following Tables 3 and 4 show that the rubber composition exhibited by Sample Z significantly increases flex life and reduces track wear and tendency for crack initiation and fatigue failure. The undesirable, reduced hardness and rebound are considered to be within an acceptable range for the track of this invention.

Actual portions of a track tread, including the ground-contacting portion, were prepared and vulcanized and identified herein as Samples XX, YY and ZZ which correspond to rubber compositions X, Y and Z of Example I herein, with Sample XX representing the Control Sample.

In particular, as shown in Table 3 for Sample ZZ, the extension of the vulcanization time to 100 minutes for the track composition (Table 3) from 50 minutes (Table 2) for the rubber composition, it is observed that equivalent rubber composition physical properties were obtained with little or no reversion of its physical properties. This cure condition, namely 100 minutes at 150° C., is intended to simulate the production track cure process conditions.

TABLE 3

Track Samples Cured for 100 Minutes

| Property | Sample XX Control | Sample YY | Sample ZZ |
|---|---|---|---|
| 300% Modulus (MPa) | 9.6 | 5.4 | 63 |
| Tensile (MPa) | 20 | 17 | 17 |
| Elongation (%) | 547 | 654 | 637 |
| Rebound (100° C.) | 50 | 46 | 42 |
| Rebound (23° C.) | 35.3 | 35.8 | 33.7 |
| Hardness, Shore A | 65 | 56 | 62 |
| DIN abrasion at 10 Newtons (mm$^3$ loss) | 139 | | |
| Fatigue flex test (kilocycles to failure) | 18.2 | 25.6 | 22.4 |
| Crack initiation test at 135° C. (Hours to crack) | 142 | 223 | 194 |
| Peel adhesion (N/mm) | 32 | 53 | 50 |

EXAMPLE III

A continuous track was prepared similar to FIG. 1 and tested with results shown in the following Table 4. Tracks XX YY and ZZ correspond to Samples XX, YY and ZZ.

TABLE 4

Tracks Cured for Approximately 100 Minutes

| Property | Track XX Control | Track YY | Track ZZ |
|---|---|---|---|
| A. Track Flex Test[1] | | | |
| Total No. of cracks | 1015 | 185 | 37 |
| Total length of cracks (cm) | 3175 | 559 | 102 |
| Flex test ranking | 3 | 2 | 1 |
| B. Treadwear Test[2] | | | |
| Average treadwear (mm/hour) | 1.37 | 1.53 | 1.16 |
| Wear ranking | 3 | 2 | 1 |

[1]The track flex test was conducted by running the track around two centimeter diameter pulleys at an equivalent ground speed of 32 kilometers per hour under a tension of 4550 Kg. The track dimensions were 594.6 cm long by 76.2 cm wide by 3.18 cm thick. Crack lengths and number of cracks in the ground-contacting tread portion were observed at least every 200 hours up to a maximum of 2000 to 3000 hours.
[2]Track wear data was obtained by mounting a control track (Sample XX composition for its tread) and an experimental track (Sample YY alternating with Sample ZZ tread ground-contacting portion rubber compositions) on a tractor. The tracks passed over a drive wheel, idler wheel and roller wheels. The depths (thickness) of lugs on the surface of the track treads, having an initial thickness of about 51 mm, were measured about every 100 to 200 hours and monitored until 1500 hours or the tread depth is about 15 mm.

The track flex test data demonstrates a significant reduction in cracking, namely a significance in resistance to cracking for the track ground-contacting tread portion of Samples YY and ZZ. In particular, Samples YY and ZZ are, respectively, 82 percent and 96 percent better when compared to the control Sample XX.

The ground-contacting portion track treadwear data also demonstrates a significant improvement in wear resistance for the track tread rubber compositions YY and ZZ. In particular, abrasion values for Samples YY and ZZ are 9 percent and 31 percent, respectively, better than that of control Sample XX.

While certain representative embodiments and details have been shown for the purpose of illustrating the invention, it will be apparent to those skilled in this art that various changes and modifications may be made therein without departing from the spirit or scope of the invention.

What is claimed is:

1. An endless rubber track designed to encompass at least one drive wheel and at least one driven wheel, comprised of an inner component containing a plurality of lugs designed to be engaged and/or guided by said drive and driven wheels and an outer tread component, said tread component being of a configuration comprised of a plurality of co-extensive, raised lugs thereon designed to be ground engaging; wherein said tread component is of a rubber composition comprised of, based upon 100 parts by weight elastomers (phr),
    (A) elastomers comprised of
        (1) about 15 to about 40 phr of cis 1,4-polybutadiene rubber and, correspondingly;
        (2) at least one additional elastomer selected from
            (i) about 60 to about 85 phr of natural cis 1,4-polyisoprene rubber; and
            (ii) zero to about 15 phr of styrene/butadiene copolymer rubber containing from 10 to 40 percent bound styrene;
    (B) about 40 to about 80 phr of reinforcing filler comprised of carbon black and a minor amount of precipitated silica; wherein said carbon black is present in an amount of about 35 to about 65 phr and said precipitated silica is present in an amount of from 3 to about 20 phr and the ratio of said carbon black to precipitated silica is in a range of about 4/1 to about 7/1; wherein said reinforcing filler is exclusive of a coupling agent having a moiety reactive with silanol groups on the surface of said silica and another moiety interactive with said elastomer(s);

(C) sulfur curative in a range of about 0.75 to about 1.5 phr and a sulfenamide sulfur cure accelerator;

(D) about 4.5 to about 10 phr of antidegradant; and (E) zero to about 10 phr of rubber processing oil selected from at least one of aromatic rubber processing oil and mixture of aromatic and naphthenic rubber processing oil; wherein said carbon black is characterized by having an Iodine Number in a range of about 115 to about 130 g/kg, a DBP value in a range of about 105 to about 125 $cm^3/100$ g, and a Tint value in a range of about 120 to about 140.

2. A sulfur-vulcanized track of claim 1.

3. The track of claim 2 wherein the rubber composition for said ground-contacting tread component has a minimum flex fatigue resistance of at least 90 kilocycles at 65 percent strain according to ASTM D4482 and an abrasion resistance in a range of about 70 to about 100 $mm^3$ loss according to ASTM D5963.

4. The track of claim 2 wherein said carbon black is selected from at least one of N220 and N234.

5. The track of claim 2 wherein said additional elastomers are comprised of about 40 to about 55 phr of natural cis 1,4-polyisoprene elastomer and about 5 to about 10 phr of styrene/butadiene copolymer rubber.

6. The track of claim 2 wherein said antidegradant is selected from at least one of polymerized 2,2,4-trimethyl 1,2-dihydroquinoline, N-1,3-dimethylbutyl-N'-phenyl para-phenylenediamine and mixed aryl-p-phenylenediamines.

7. A combination of a vehicle and track systems, wherein said combination is comprised of a vehicle having at least two opposing endless rubber track systems, namely a track system on each side of the vehicle, for driving said vehicle over the ground, said track systems individually comprised of the track of claim 2, a plurality of wheels engaged with said vehicle and encompassed by said track wherein at least one of said wheels is a drive wheel.

8. A combination of a vehicle and track systems, wherein said combination is comprised of a vehicle having at least two endless rubber track systems, namely a track system on each side of the vehicle, for driving said vehicle over the ground, said track systems individually comprised of the track of claim 3, a plurality of wheels engaged with said vehicle and encompassed by said track wherein at least one of said wheels is a drive wheel.

9. A combination of a vehicle and track systems, wherein said combination is comprised of a vehicle having at least two endless rubber track systems, namely a track system on each side of the vehicle, for driving said vehicle over the ground, said track systems individually comprised of the track of claim 5, a plurality of wheels engaged with said vehicle and encompassed by said track; wherein at least one of said wheels is a drive wheel.

10. A combination of a vehicle and track systems, wherein said combination is comprised of a vehicle having at least two endless rubber track systems, namely a track system on each side of the vehicle, for driving said vehicle over the ground, said track systems individually comprised of the track of claim 6, a plurality of wheels engaged with said vehicle and encompassed by said track; wherein at least one of said wheels is a drive wheel.

* * * * *

UNITED STATES PATENT AND TRADEMARK OFFICE
CERTIFICATE OF CORRECTION

PATENT NO. : 6,296,329 B1
DATED : October 2, 2001
INVENTOR(S) : Michael Brendan Rodgers et al.

Page 1 of 1

It is certified that error appears in the above-identified patent and that said Letters Patent is hereby corrected as shown below:

<u>Column 8,</u>
Line 14, change "72" to -- 7.2 --

Signed and Sealed this

Twenty-first Day of May, 2002

Attest:

Attesting Officer

JAMES E. ROGAN
*Director of the United States Patent and Trademark Office*